United States Patent [19]

Acevedo et al.

[11] Patent Number: 5,665,855

[45] Date of Patent: Sep. 9, 1997

[54] POLYMERS AND COPOLYMERS ORIGINATING FROM THE ADDITION OF OLIGOMERS CONTAINING DIAMINO AND DIHYDROXY ENDS AND OF BISOXAZINONES OR BIOXAZOLINONES, AND PROCESS FOR OBTAINING THEM

[75] Inventors: Margarita Acevedo, Madrid, Spain; Alain Fradet, Issy Les Moulineaux; Didier Judas, Paris, both of France

[73] Assignee: Elf Atochem S.A., Puteaux, France

[21] Appl. No.: 95,347

[22] Filed: Jul. 23, 1993

[30] Foreign Application Priority Data

Jul. 24, 1992 [FR] France ..................... 92 09184

[51] Int. Cl.$^6$ .................... C08G 73/00; C08G 63/00
[52] U.S. Cl. .................. 528/353; 528/125; 528/128; 528/172; 528/173; 528/179; 528/180; 528/181; 528/182; 528/186; 528/187; 528/208; 528/229; 528/340; 528/352; 528/343; 528/342
[58] Field of Search .................. 528/343, 342, 528/125, 128, 172, 173, 179, 180, 181, 182, 186, 187, 208, 229, 340, 352, 353

[56] References Cited

U.S. PATENT DOCUMENTS 3,674,741 7/1972 Shunichiro et al. ............. 528/353

FOREIGN PATENT DOCUMENTS 581642 2/1994 European Pat. Off. .
55-127432 10/1980 Japan .
55-160025 12/1980 Japan .
56-002320 1/1981 Japan .
57-049615 3/1982 Japan .
62-064826 3/1987 Japan .
62-0841128 4/1987 Japan .

OTHER PUBLICATIONS

Journal of Applied Polymer Science, vol. 34, No. 8, Dec., 1987, "Chain Extenders for Polyesters. VI, Properties of the Polyesters Chain–Extended by 2,2'–Bis(4H–3, 1–Benzoxazin–4–one)", Inata et al, pp. 2769–2776.

Primary Examiner—James J. Seidleck
Assistant Examiner—P. Hampton-Hightower
Attorney, Agent, or Firm—Burns, Doane, Swecker & Mathis, L.L.P.

[57] ABSTRACT

Disclosed are polymers and copolymers containing at least one repeating unit of the formula

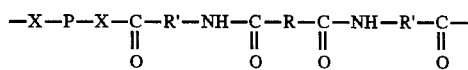

in which X is O or NH; R is a single bond or a hydrocarbon chain; R' is a hydrocarbon chain containing one or two carbon atoms, and P is the residue of an oligomer HX—P—XH whose solution viscosity determined in meta-cresol at 30° C. at concentrations of 0.5 g/dl is lower than 0.50 dl/g$^{-1}$. Also disclosed is a process for obtaining the polymers and copolymers.

14 Claims, No Drawings

POLYMERS AND COPOLYMERS ORIGINATING FROM THE ADDITION OF OLIGOMERS CONTAINING DIAMINO AND DIHYDROXY ENDS AND OF BISOXAZINONES OR BIOXAZOLINONES, AND PROCESS FOR OBTAINING THEM

The present invention relates to polymers and copolymers which can reach high molecular masses and to a process for obtaining them at atmospheric pressure without removal of by-products, by a rapid reaction which can be adapted to the R.I.M. (reaction injection moulding) process at 150°–350° C. More precisely, this reaction is an addition of chain couplers of cyclic iminoester type and of oligomers containing hydroxyl or amine reactive ends.

Conventional polycondensations are equilibrium reactions. It is difficult to obtain polymers of high molecular masses unless the work is done at elevated temperature and reduced pressure for a very long reaction time, resulting in the existence of secondary reactions and possibly of degradation of the polymers.

To overcome these difficulties the Applicant Company has reacted well-defined oligomers with reactive ends in bulk at a temperature above their melting temperature, with so-called chain coupler (CC) molecules to obtain a product of high molecular mass. The CCs in which the Applicant Company has been interested, are, more precisely, bisoxazinones and bisoxazolinones.

It is known to employ such chain couplers for increasing the molecular masses of polymers with molecular masses which are already high, carrying reactive functional groups, but which are present in a low concentration. The viscosity of these polymers is then increased and their content of reactive functional groups is decreased.

Thus, Japanese Patent Kokai Tokkyo Kobe 55160025 describes the mixture of a polyamide of high molecular mass and containing few end amine functional groups, with a bisoxazolinone.

However, this document, according to which the starting materials are polymers of high molecular masses, does not indicate how to overcome the difficulties in obtaining such polymers, and by polycondensation in particular.

The subject of the present invention is therefore polymers and copolymers containing at least one repeat unit of formula:

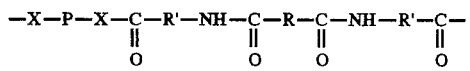

in which

X is O or NH,

R is a single bond or a linear or cyclic, aliphatic or aromatic hydrocarbon chain, which may be substituted, R' is an aliphatic or aromatic hydrocarbon chain which may be substituted and in which the shortest chain connecting the neighbouring units

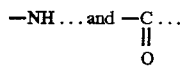

contains one or two carbon atoms, and

P is the residue of an oligomer HX—P—XH whose solution viscosity determined in meta-cresol at 30° C. at concentrations of 0.5 g/dl is lower than 0.50 dl g$^{-1}$;

R may, for example, consist of:

a single bond a hydrocarbon chain of the $(CH_2)_q$ type with q between 1 and 10, in which one or more carbon atoms may be mono- or disubstituted and capable of containing an aliphatic or aromatic ring or else an olefinic unsaturation, an ortho-, meta- or para-phenylene or an ortho-, meta- or para-alkylphenylene, which may be substituted;

R' may, for example, consist of:

a hydrocarbon chain of the $(CH_2)_p$ type with p=1 or 2, in which one or two consecutive carbon atoms may be mono- or disubstituted by alkyl groups such as methyl, ethyl or propyl groups, it being furthermore possible for two of these carbon atoms to form part of a benzene ring which can itself be substituted by one or more alkyl groups;

P is the residue of an oligomer HX—P—XH in which X denotes O or NH, of mono- or polyblock structure, in which the blocks may, for example, consist of polyamide, polyether or polyester.

There will be mentioned, in particular:

a polyamide containing $diNH_2$ ends of aliphatic structure, obtained from lactam and/or amino acid and/or diacid and diamine in the presence of an excess of diamine, which has the formula:

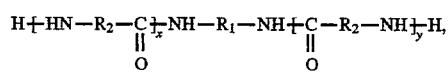

as described in European Patent Application EP-A-281,461 in the name of the Applicant Company, and in which $R_2$ is:

a hydrocarbon chain constituting a lactam and/or an amino acid in which the number of carbon atoms is preferably between 4 and 14, a structure

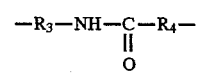

in which $R_3$ and $R_4$ are the hydrocarbon residues of a diamine and of a diacid respectively;

$R_1$ denotes the residue of an organic diamine containing an aliphatic or cycloaliphatic hydrocarbon chain, employed as chain limiter;

x and y are integers $\geq 0$, such that $\overline{x+y} \geq 1$;

a polyamide with $diNH_2$ ends of aliphatic or semiaromatic structure as described in Patent Application EP-A-313,436 in the name of the Applicant Company, obtained from:

aromatic diacids such as iso- and terephthalic acids, naphthalenedicarboxylic acids (in position 2,6, 1,5 and 2,7) and 4,4'-dicarboxydiphenyl ether and 4,4'-dicarboxybiphenyl, linear or branched, for example $C_4$–$C_{24}$, aliphatic diacids such as adipic, sebacic, 1,10-decanedioic and 1,12-dodecanedioic acids, cycloaliphatic diacids such as 1,4-cyclohexanedicarboxylic acid, cycloaliphatic diamines, for example substituted or unsubstituted 4,4'-diaminobis (cyclohexylmethane), such as bis(3,3'-methyl-4,4'-aminocyclohexylmethane), bis(4,4'-aminocyclohexylmethane) or isophoronediamine, linear or branched, for example $C_4$–$C_{24}$, aliphatic diamines such as 1,6-hexamethylenediamine and 1,12-dodecamethylenediamine, lactams, for example $C_5$–$C_{14}$, such as caprolactams and dodecalactams, amino acids, for example $C_5$–$C_{14}$, such as 11-aminoundecanoic acid, in a ratio such that [COOH]/[NH$_2$]= m/m+1, with m integer $\geq 1$, a polyether with diOH ends such as polyethylene glycol, polypropylene glycol, polytetramethylene glycol or their copolymers, a polyether with diNH$_2$ ends of formula

in which Q is a hydrocarbon chain of —(CH$_2$)$_n$— type, with $1 \geq n \geq 24$, it being possible for one or more carbon atoms to be mono- or disubstituted, which is obtained by chemical modification of a diOH polyether such as polyethylene glycol, polypropylene glycol, polytetramethylene glycol or their copolymers, a triblock (a=1) or polyblock (a>1) oligomer of formula:

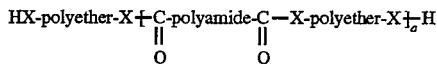

with X=O or NH,
which is obtained from:
polyamide with diCOOH ends of formula

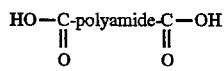

or

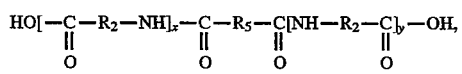

in which $R_2$ and $R_5$ denote aliphatic, cycloaliphatic or aromatic hydrocarbon chains, x and y denote positive integers such that $\overline{x+y} \geq 1$, this polyamide with diCOOH ends being itself obtained from the same monomers as the polyamide with diNH$_2$ ends which is described above, and from polyether with diNH$_2$ or diOH ends, such as those described above, a polyester with diOH ends, of aliphatic or semiaromatic structure, obtained from diacid and/or acid anhydride and/or aromatic and/or aliphatic diester and from an excess of diol, which has the general formula

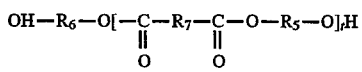

in which t>1, $R_6$ denotes the residue of a linear or branched $C_6$–$C_{24}$ aliphatic diol such as ethylene glycol, propylene glycol, 1,4-butanediol, 1,5-pentanediol, 1,6-hexanediol, diethylene glycol or triethylene glycol, $R_7$ denotes the residue of a diacid and/or of an acid anhydride and/or of an aromatic diester, this acid anhydride consisting, for example, of succinic, phthalic or tetrahydrophthalic anhydride, this aromatic diester of dimethyl terephthalate or dimethyl isophthalate, the diacid being identical with those from which the $R_5$ originates, a polyetherester with diOH ends, of aliphatic or semiaromatic structure of formula

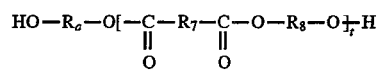

in which t>1, $R_7$ is as defined above, and $R_8$ is the residue of a diol or of a polyether with diOH ends, this polyetherester being obtained from a diacid and/or from an acid anhydride and/or from an aromatic diester such as those from which the polyester containing diOH ends which is defined above originates, from a polyether with diOH ends as described above, and from an excess of diol.

The oligomers HX—P—XH used have in particular solution viscosities, determined in meta-cresol at 30° C., at concentrations of 0.5 g/dl, of between 0.05 and 0.50 dl g$^{-1}$, and number-average molecular masses M$_n$ of between 300 and 5000.

The polymers according to the present invention are obtained by bulk addition reaction of oligomers HX—P—XH and of bisoxazinones and/or of bisoxazolinones of formula

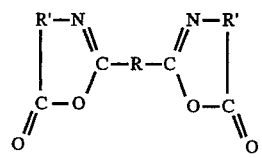

in which R, R', X and P are as defined above. This addition or coupling reaction is in accordance with the following general scheme:

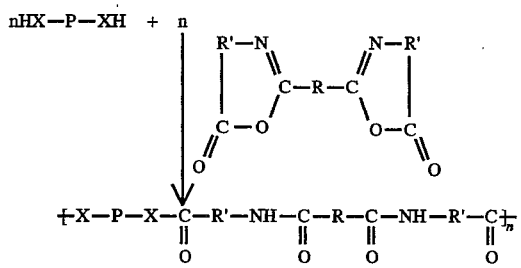

To perform this synthesis it is appropriate to choose a temperature such that the viscosity of the oligomer is sufficiently low, and especially lower than 500 Pa s and preferably lower than 300 Pa s, so that the molecules of the chain couplers can be dispersed, be incorporated and/or be dissolved in the oligomer. This temperature is between 100° and 350° C. and preferably between 150° and 330° C.

The reaction period under inert atmosphere is between 1 and 120 minutes, preferably between 5 and 30 minutes, at atmospheric pressure.

Polymers according to the invention, whose solution viscosities determined in meta-cresol at 30° C. at concentrations of 0.5 g/dl are higher than those of the initial oligomer (or oligomers) capable of reaching, for example, values higher than 0.8 dl g$^{-1}$, of high number-average molecular masses $\overline{M}_n$, which are higher than 10,000, can thus be obtained without removal of by-products and without the other difficulties inherent in conventional polycondensations.

One or more chain couplers and one or more oligomers can be employed. Thus, the simultaneous or, on the contrary, consecutive addition of different oligomers makes it possible to obtain polymers of more or less pronounced random or block characteristics.

Use of a catalyst is not necessary, but accelerates the reaction. 0.001 to 2% by weight, in relation to the oligomers and to the chain couplers, and preferably 0.01 to 0.5% of one or a number of conventional catalysts is therefore added, such as 4,4'-dimethylamino-pyridine, para-toluenesulphonic acid, $H_3PO_4$, NaOH or the catalysts described in European Patent Application EP-A-425,341 in the name of the Applicant Company.

In these conditions the reaction may be carried out noncontinuously in a stirred reactor or in an extruder. It is then possible to operate using dry blending or to incorporate the coupler into the molten oligomer in an extruder barrel, by introducing it continuously as a function of the throughput of the extruder in order to conform to the stoichiometry of the reactive functional groups.

The ratio

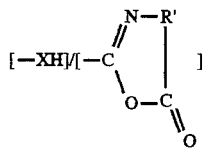

is preferably maintained between 0.95 and 1.05.

As a result, the reaction product will have end groups which are —XH if this ratio is higher than 1,

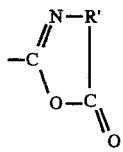

if this ratio is lower than 1 or both —XH and

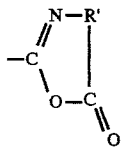

if this ratio is equal to 1

The following examples illustrate the invention.

In these examples:

The melting and glass transition points have been determined by differential scanning calometry (DSC, DuPont 9900). The melting point has been determined at the maximum of the melting endotherm at a heating rate of 20° C./min, on the second run after a heating cycle at 20° C./min up to a temperature above the melting point of the analysed sample followed by cooling to ambient temperature at 40° C./min.

The weight losses have been measured by thermogravimetry (TGA DuPont 951) at 20° C./min. $T_{5\%}$ corresponds to the temperature at which the product has lost 5% of its original mass.

The chemical determinations have been performed on a Mettler DL40 RC apparatus. A blank determination was always performed before the actual determination.

The $NH_2$ group content has been determined by titration at 40° C. with a 0.1N solution of perchloric acid in ethanol, the sample being dissolved in a 50/25/25 (vol.) phenol/ethanol/water mixture.

The hydroxyl group content has been determined either by acetylation and back-titration of the acidity with a 0.1N alcoholic potassium hydroxide solution, or by proton nuclear magnetic resonance (NMR).

The solution viscosity $\eta_{inh}$ has been determined in meta-cresol at 30° C. at concentrations of 0.5 g/dl.

The chain couplers employed and the starting oligomers are the following.

Chain couplers:

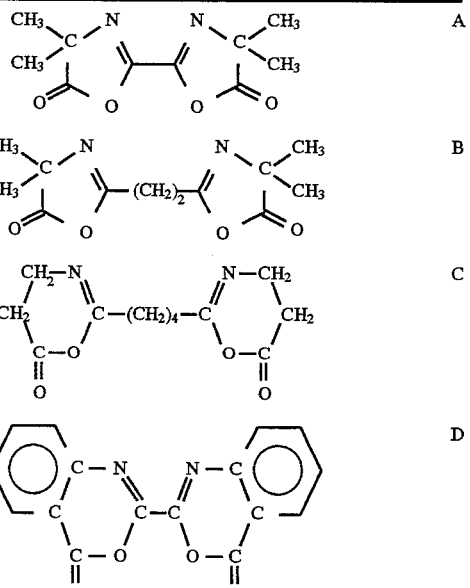

The bisoxazinones or bisoxazolinones A, B and C, of formulae

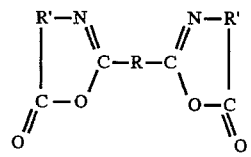

can be obtained by cyclization of diacids of formulae

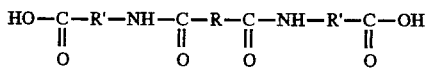

and the bisbenzoxazinone D by reaction of isatoic anhydride with oxalyl dichloride according to the following scheme:

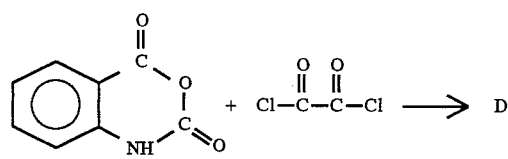

Oligomers:

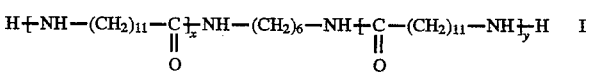

with x+y=5.17

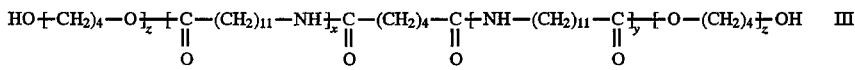   III with z=14,19

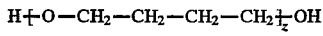   II with z=4.19 and x+y=4.72.

Oligomer IV is an oligoamide with a semiaromatic structure and diNH₂ ends, obtained from terephthalic acid (T)
isophthalic acid (I)
lactam 12 (n12)
bis(3,3'-methyl-4,4'-aminocyclohexyl)methane (BMACM) with T/I/L12/BMACM=3/2/2.5/6 (on a molar basis).

Oligomer V is a polyether with diNH₂ ends, sold under the registered name Jeffamine ED 900 by Texaco.

The characteristics of the initial oligomers are listed in the table below.

| Oligomers | [ends] (mol/kg) | $\eta_{inh}$ (dl g$^{-1}$) | $M_n$ | M.p. (°C.) | $T_{5\%}$ (°C.) |
|---|---|---|---|---|---|
| I | [NH₂] = 1.76 | 0.20 | 1136 | 155 | 366 |
| II | [OH] = 1.925 | 0.08 | 1040 | 25 | 304 |
| III | [OH] = 0.64 | 0.30 | 3120 | 24 and 147 | 335 |
| IV | [NH₂] = 0.78 | 0.17 | 2575 | — | 340 |
| V | [NH₂] = 2,21 | 0.10 | 905 | 28 | 328 |

EXAMPLE 1

Reaction of the diamino oligoamide I with bisoxazolinone A 10.00 g (8.80 mmol) of I and 1.973 g (8.80 mmol) of bisoxazolinone A are introduced into a 50-cm³ reactor equipped with oil bath heating, a nitrogen inlet and outlet and with a mechanical anchor stirrer. The mixture is heated to 200° C. with stirring for 15 min to give, after cooling, a polymer which has the following characteristics:

[NH₂]=0.09 mol/kg
$\eta_{inh}$=0.95 dl/g
$T_m$=149° C.
$T_{5\%}$=390° C.

EXAMPLE 2

Reaction of the diamino oligoamide I with bisoxazolinone B 6,640 g (5.84 mmol) of I and 1,473 g (5.84 mmol) of bisoxazolinone B are introduced into a 50-cm³ reactor equipped with oil bath heating, a nitrogen inlet and outlet and a mechanical anchor stirrer. The mixture is heated to 180° C. with stirring for 15 min to give, after cooling, a polymer which has the following characteristics:

[NH₂]=0.11 mol/kg
$\eta_{inh}$=0.90 dl/g
$T_m$=148° C.
$T_{5\%}$=385° C.

EXAMPLE 3

Reaction of dihydroxy oligoether II with bisoxazolinone A 6.00 g (5.77 mmol) of II, 1.294 g (5.77 mmol) of bisoxazolinone A and 0.036 g (0.5%) of 4,4'-dimethylaminopyridine are introduced into a 50-cm³ reactor equipped with oil bath heating, a nitrogen inlet and outlet and a mechanical anchor stirrer. The mixture is heated to 185° C. with stirring for 20 min to give, after cooling, a polymer which has the following characteristics:

[OH]=0.15 mol/kg
$\eta_{inh}$=0.30 dl/g
$T_m$=35° C.
$T_{5\%}$=340° C.

EXAMPLE 4

Reaction of the dihydroxy oligoether II with bisoxazinone C 6.00 g (5.77 mmol) of II and 1.456 g (5.77 mmol) of bisoxazinone C are introduced into a 50-cm³ reactor equipped with oil bath heating, a nitrogen inlet and outlet and a mechanical anchor stirrer. The mixture is heated to 190° C. with stirring for 120 min to give, after cooling, a polymer which has the following characteristics:

[OH]=0.33 mol/kg
$\eta_{inh}$=0.24 dl/g
$T_m$=28° C.
$T_{5\%}$=337° C.

EXAMPLE 5

Reaction of the triblock dihydroxy oligomer III with bisoxazolinone B 4.050 g (1.30 mmol) of III, 0.34 g (1.35 mmol) of bisoxazolinone B and 0.011 g of 4,4'-dimethylaminopyridine are introduced into a 25-cm³ reactor equipped with oil bath heating, a nitrogen inlet and outlet and a mechanical anchor stirrer. The mixture is heated to 200° C. with stirring for 45 min to give, after cooling, a polymer which has the following characteristics:

$\eta_{inh}$=0.92 dl/g
$T_m$=27 and 149° C.
$T_{5\%}$=382° C.

EXAMPLE 6

Reaction of the diamino oligoamide IV with bisoxazinone D 25.75 g (0.01 mol) of oligoamide IV and 2.92 g (0.01 mol) of bisoxazinone D are introduced into an 80-cm³ reactor fitted with stirrer and equipped with a system which makes it possible to work under inert atmosphere (N₂).

The reactor is immersed in an oil bath controlled at 300° C. The reaction mixture is stirred with a stirrer rotating at 50 revolutions/min. After 20 minutes under these conditions an increase in the viscosity of the reaction mixture is observed, requiring a decrease in the stirring speed to 10 revolutions/min. The reaction is then continued for 5 minutes and then stopped.

The polymer obtained is translucent and according to thermal analysis has a glass transition at 203° C.

Its solution viscosity is 0.83 dl g⁻¹ and its residual NH₂ concentration is 0.2 mol/kg.

EXAMPLE 7

Reaction of the diamino oligoether V with bisoxazolinone B 3.75 g (4.14 mmol) of V and 1.045 g (4.14 mmol) of bisoxazolinone B are introduced into a 25-cm$^3$ reactor equipped with an oil bath heating, a nitrogen inlet and outlet and a mechanical anchor stirrer. The mixture is heated to 185° C. with stirring for 20 min to give, after cooling, a polymer which has the following characteristics:

[NH$_2$]=0.13 mol/kg $\eta_{inh}$=0.31 dl/g $T_g$=−32° C.

$T_{5\%}$=335° C.

EXAMPLE 8

Reaction of diamino oligoamide I and of diamino oligoether V with bisoxazolinone A 1.18 g (1.30 mmol) of V, 1.48 g (1.31 mmol) of I and 0.58 g (2.60 mmol) of A are introduced into the reactor employed in the preceding example. The mixture is heated to 200° C. with stirring for 30 min to give, after cooling, a polymer which has the following characteristics:

[NH$_2$]=0.12 mol/kg $\eta_{inh}$=0.75 dl/g $T_m$=148° C.

$T_g$=−19° C.

$T_{5\%}$=365° C.

We claim:

1. A polymer or copolymer comprising at least one repeating unit of the formula:

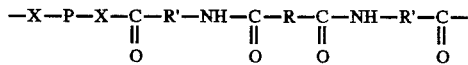

in which

R is selected from the group consisting of a single bond; a hydrocarbon chain —(CH$_2$)$_q$—, q being an integer between 1 and 10 in which at least carbon atom is unsubstituted or mono- or disubstituted and may contain an aliphatic or an aromatic ring or an olefinic unsaturation; an ortho-, meta-, or para-phenylene group; and an ortho-, meta- or para- alkylphenylene group, R' is a —(CH$_2$)— group with p being 1 or 2, in which at least carbon atom is unsubstituted or mono- or disubstituted with an alkyl group selected from the group consisting of methyl, ethyl and propyl; or an ortho-phenylene group, and the group —X—P—X— is the residue of a difunctional oligomer HX—P—XH, in which X denotes O or NH and P is an oligomeric chain selected from the group consisting of a polyamide oligomer, a polyester oligomer, a polyether oligomer, a polyetherester oligomer, and a polyblock oligomer of the formula:

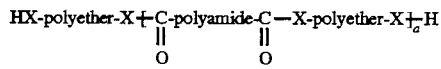

with a ≧1, wherein said polymer or copolymer is the reaction product by mass addition of at least one oligomer HX—P—XH whose solution viscosity determined in meta-cresol at 30° C. at a concentration of 0.5 g/dl is lower than 0.50 dl g$^{-1}$ and whose number average molar mass $M_n$ is between 300 and 5000, with at least one bisoxazinone and bisoxazolinone of the formula:

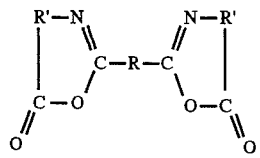

in which X, R and R' are as defined above, at a temperature above the melting point of the at least one oligomer, and wherein said at least one oligomer is reacted with said at least one bisoxazinone and bisoxazolinone in a proportion such that the ratio

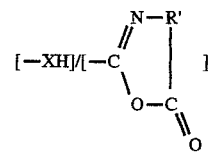

is between 0.95 and 1.05.

2. A polymer or copolymer as claimed in claim 1, which is obtained from at least one oligomer HX—P—XH having a viscosity determined in meta-cresol at 30° C. at a concentration of 0.5 g/dl of between 0.05 and 0.50 dl g$^{-1}$.

3. A polymer or copolymer as claimed in claim 1, which is obtained from at least one oligomer HX—P—XH having a viscosity determined in meta-cresol at 30° C. at a concentration of 0.5 g/dl of between 0.08 and 0.30 dl g$^{-1}$.

4. A polymer or copolymer as claimed in claim 1 being the reaction product of at least one oligomer and at least one bisoxazinone and bisoxazolinone in a stoichiometric ratio.

5. A polymer or copolymer according to claim 1, in which R is a single bond between two carbon atoms.

6. A polymer or copolymer according to claim 1, in which R is —(CH$_2$)$_q$—, q being an integer between 1 and 10.

7. A polymer or copolymer according to claim 1, in which R' is —(C(CH$_3$)$_2$)—.

8. A polymer or copolymer according to claim 1, in which R' is —(CH$_2$)$_2$—.

9. A polymer or copolymer according to claim 1, in which R' is an ortho-phenylene group.

10. A polymer or copolymer as claimed in claim 1, in which

R is selected from the group consisting of a single valence bond; and alkylene group having from 1 to 10 carbon atoms; and an ortho-, meta- or para-phenylene;

R' is selected from the group consisting of a substituted or unsubstituted alkylene group having 1 or 2 carbon atoms in which the substitutions are methyl, ethyl or propyl; and an ortho-phenylene ring.

11. A process for obtaining a polymer or copolymer comprising at least one repeating unit of the formula:

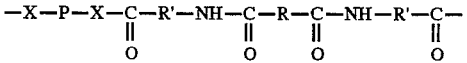

in which

R is selected from the group consisting of a single bond; a hydrocarbon chain —(CH$_2$)$_q$—, q being an integer between 1 and 10 in which at least one carbon atom is unsubstituted or mono- or disubstituted and may contain an aliphatic or aromatic ring or an olefinic unsaturation; an ortho-, meta-, or para-phenylene group; and an ortho-, meta- or para-alkylphenylene group, R' is a —(CH$_2$)$_p$— group with p being 1 or 2, in which at least one carbon atom is unsubstituted or mono- or disubstituted with an alkyl group selected from the group consisting of methyl, ethyl and propyl; or an ortho-phenylene group, and the group —X—P—X— is the residue of a difunctional oligomer HX—P—XH, in which X denotes O or NH and P is an oligomeric chain whose solution viscosity determined in meta-cresol at 30° C. at a concentration of 0.5 g/dl is lower than 0.50 dl g$^{-1}$ and whose number average molar mass M$_n$ is between 300 and 5000, and is the residue of a polyamide oligomer, a polyester oligomer, a polyether oligomer, a polyetherester oligomer, or a polyblock oligomer of the formula:

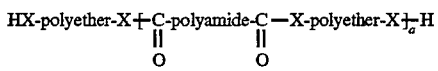

with a≧1, said process comprising carrying out a bulk addition reaction of at least one oligomer HX—P—XH and at least one bisoxazinone and bisoxazolinone having the formula:

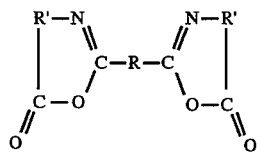

at a temperature above the melting temperature of said at least one oligomer, and at atmospheric pressure under an inert atmosphere, wherein said at least one oligomer is reacted with said at least one bisoxazinone and bisoxazolinone in a proportion such that the ratio

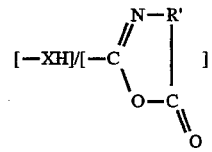

is between 0.95 and 1.05.

12. A process according to claim 11, wherein the temperature of the reaction mixture is between 100° and 350° C. so that the viscosity of said at least one oligomer is lower than 50 Pa and wherein the reaction time is between 1 and 120 minutes.

13. A process according to claim 11 wherein from 0.001 to 2% by weight of one or more catalysts, in relation to said at least one oligomer and said at least one bisoxazinone and bisoxazolinone, is added to the reaction mixture.

14. A process according to claim 10, wherein the bulk addition reaction is performed non-continuously in a stirred reactor or in an extruder.

* * * * *